United States Patent [19]

Morita et al.

[11] Patent Number: 4,952,627

[45] Date of Patent: Aug. 28, 1990

[54] PROCESS FOR PRODUCING HIGH IMPACT STYRENE RESIN BY CONTINUOUS BULK POLYMERIZATION

[75] Inventors: Tsuyoshi Morita, Chiba; Masaru Enomoto, Yokkaichi; Kyotaro Shimazu, Chiba, all of Japan

[73] Assignee: Dainippon Ink and Chemicals, Inc., Japan

[21] Appl. No.: 209,958

[22] Filed: Jun. 22, 1988

Related U.S. Application Data

[63] Continuation-in-part of Ser. No. 75,971, Jul. 21, 1987, abandoned.

[30] Foreign Application Priority Data

Jul. 25, 1986 [JP] Japan ................... 61-173699
Jul. 31, 1986 [JP] Japan ................... 61-180763

[51] Int. Cl.$^5$ ............................ C08F 279/02
[52] U.S. Cl. ........................ 525/52; 525/53; 525/54
[58] Field of Search ................ 525/52, 53, 54

[56] References Cited

U.S. PATENT DOCUMENTS 3,660,535  5/1972  Finch et al. .................... 525/53
4,209,599  6/1980  Brady et al. .................... 526/64

FOREIGN PATENT DOCUMENTS 1199750  1/1986  Canada .
0096201  12/1983  European Pat. Off. .
59-1515A  1/1984  Japan .
1530023  10/1978  United Kingdom .

Primary Examiner—Wilbert J. Briggs, Sr.
Attorney, Agent, or Firm—Sherman and Shalloway

[57] ABSTRACT

In a process for producing a high impact styrene resin by continuously polymerizing a styrene monomer in bulk in the presence of a rubbery polymer, the improvement wherein a polymerization line is used which is comprised of an initial-stage polymerization line (II) following a material feed line (I) and consisting of one or more tubular reactors having fixedly set therein a plurality of mixing elements having no moving parts, a main polymerization line (III) following the initial-stage polymerization line (II) and consisting of one or more tubular reactors having fixedly set therein a plurality of mixing elements having no moving parts, and a recycle line (IV) which branches between the initial-stage polymerization line (II) and the main polymerization line (III) and returns to the initial-stage polymerization line (II), and a minor part or a major part of a flow of the initial-stage polymer solution leaving the initial-stage polymerization line (II) is recycled through the recycle line (IV) while the remaining non-recycled initial-stage polymer flow is polymerized in the main polymerization line (II).

6 Claims, 1 Drawing Sheet

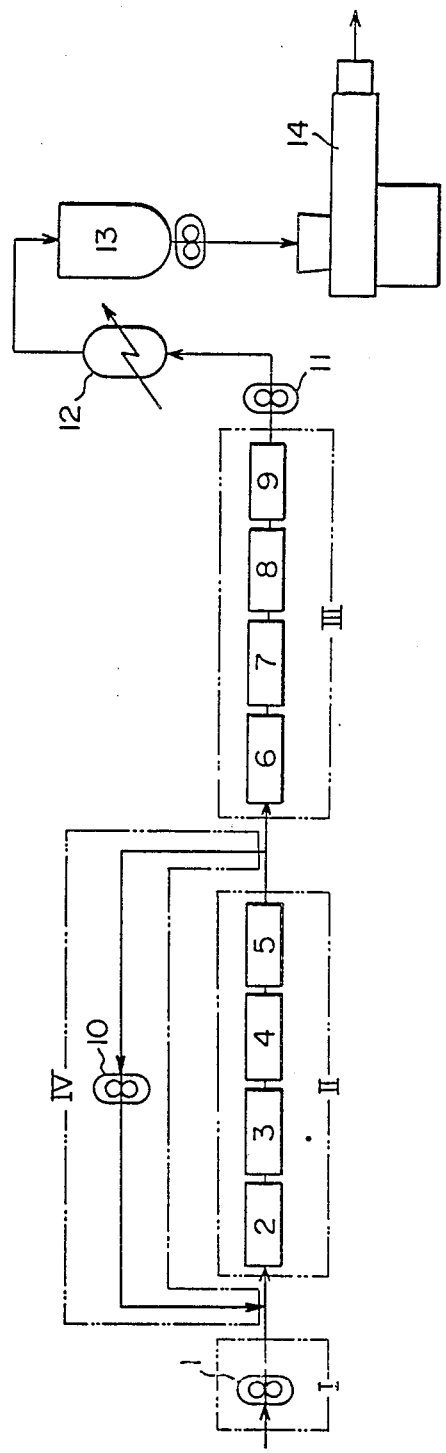

PROCESS FOR PRODUCING HIGH IMPACT STYRENE RESIN BY CONTINUOUS BULK POLYMERIZATION

CROSS-REFERENCE TO RELATED APPLICATION

This application is a continuation-in-part application of Ser. No. 075,971 filed July 21, 1987, now abandoned.

BACKGROUND OF THE INVENTION

1. Field of the Invention

This invention relates to a process for producing a high impact styrene resin by continuous bulk polymerization, and to a high impact styrene resin obtained by this process. More specifically, it relates to a process for producing by continuous bulk polymerization a high impact styrene resin having excellent strength in which a grafted rubbery polymer in the resin has a narrow particle size distribution, and to a high impact styrene resin obtained by this process.

2. Description of the Prior Art

In the production of a high impact styrene resin by graft polymerizing a styrene monomer in the presence of a rubbery polymer, how to control the dispersion of the rubbery polymer uniformly as fine particles and the stabilization of the rubbery polymer particles during the graft polymerization is especially important in determining the quality of the resulting resin. The particle size and particle size distribution of the grafted rubbery polymer particles dispersed in the final resin, and the grafting ratio of styrene greatly affect the impact strength and gloss of the final resin.

For the industrial production of high impact styrene resin, a batchwise bulk-suspension polymerization method and a continuous bulk polymerization method have generally been employed. The continuous method, however, has been found to be superior in productivity and economy, and has gained widespread acceptance.

Usually, in the continuous bulk polymerization method, it is general practice to provide a plurality of stirred tank reactors and to perform polymerization while continuously feeding a starting material solution.

More specifically, there was proposed a method in which in an initial polymerization step, the rubbery polymer is divided into fine particles and dispersed by dynamic mixing in a stirred tank reactor with a stirrer, and thereafter, the polymer solution is continuously transferred to a plurality of stirred tank reactors, and the polymerization is allowed to proceed with stirring.

It has been pointed out however that the continuous bulk polymerization using the tank reactors has the defects attributed to the dynamic mixing by the stirrer. Specifically, when the viscosity of the polymer solution in the tank rises as the polymerization proceeds, the power or the strength of the stirring vanes has to be increased. To avoid it, the polymerization conversion of the styrene monomer in the tank must be inhibited as the polymerization proceeds. Alternatively, if excessive stirring and mixing is carried out an excessive shearing force is exerted on the rubbery polymer dispersed as fine particles. Consequently, the dispersed fine particles of the rubbery polymer are broken, and the particle size distribution of the rubbery polymer particle becomes broad. As a result, the strength of the final product decreases. Another defect is that since the stirred tank reactor has an excessive capacity because of its structure, a long period of time is required, for example, in switching from one brand to another in the production of resins in which the rubbery polymer has different particle diameters. In an attempt to remove these defects of the stirred tank reactor, there have been made some suggestions including the structure of stirring vanes, the performance of pre-polymerization, or the combination of it with a tubular reactor or a tower-type reactor. But these suggestions have not proved to be sufficient for removing the above defects.

Some proposals, for example the improvement of stirring blades, the use of a tubular reactor having a stirrer and the use of a recycle line, were made in an attempt to remove these defects of the stirred tank reactor, but no entirely satisfactory improvement has yet been achieved.

For example, in U.S. Pat. No. 3,660,535, the dispersion of the rubbery polymer and the formation of fine particles are controlled by stirring and recycling the initial-stage polymer solution by using a vertical tubular reactor (towered reactor) having a stirrer and a recycle line. If, however, the amount of the initial-stage polymer solution recycled is increased in this method in an attempt to disperse the rubbery polymer uniformly, the rubbery polymer tends to have an increased average particle size and a broadened particle size distribution. Hence, to obtain a resin having a small average particle size and a narrow particle size distribution, it is necessary to decrease the amount of the initial-stage polymer solution recycled and consequently, the dispersion of the rubbery polymer is not effected well. Thus, it is difficult in this method to produce a resin having a small average particle size and a narrow particle size distribution with uniformly dispersed rubbery polymer particles, namely a resin having excellent gloss and impact strength. Furthermore, it may be possible in this method to increase the rotating speed of the stirrer as means for uniformly dispersing the rubbery polymer and decreasing its average particle size. This, however, results in an excessive shearing force on the rubbery polymer, a broadening of its particle size distribution and further in a reduction in its impact strength, and a resin having excellent gloss and impact strength is difficult to produce.

In view of this state of the art, the present inventors studied a method of continuously producing high-impact polystyrene in tubular reactors having fixedly set therein a plurality of mixing elements having no moving parts.

On the utilization of a tubular reactor in a continuous polymerization, U.S. Pat. No. 4,275,177 proposes a process which uses a tank reactor having a stirrer for carrying out an initial-stage polymerization and a tubular reactor having fixedly set therein a plurality of mixing elements having no moving parts for carrying out the main polymerization. In this process, however, the defects attributed to the dynamic mixing by the stirrer within the tank cannot be removed, and an excessively high shear owing to the intense stirring and mixing is exerted to broaden the particle size distribution of the rubbery polymer particles. The grafting ratio of styrene is not increased, and the results are still unsatisfactory.

SUMMARY OF THE INVENTION

The present inventors then made investigations on a method of finely dividing the rubbery polymer and dispersing it as fine particles by performing polymerization in a tubular reactor having fixedly set therein a plurality of mixing elements having no moving parts. This investigation has revealed the following fact. For the rubbery polymer to be finely divided and dispersed as fine particles, appropriate shearing is required in the early stage of polymerization. For this purpose, the presence of a mixer is essential. The degree of mixing by a tubular reactor having fixedly set therein a plurality of mixing elements having no moving parts, such as a static mixer, is determined by the superficial velocity of the polymer solution in the reactor. Since it depends upon the flow rate and the tubular diameter, it is necessary to increase the flow rate greatly in order to perform sufficient mixing. However, there is a limit to the increasing of the flow rate in the tubular reactor because as the polymerization proceeds the viscosity of the polymer solution increases markedly and the pressure drop in the tube increases. Consequently, sufficient shear cannot be obtained. In an ordinary tubular reactor, this weak shear leads to a failure to obtain a desirable particle size in the rubbery polymer although the rubbery polymer can be dispersed as fine particles. A further problem is that the rubbery polymer precipitated in the early stage of the polymerization adheres to the wall of the reactor. If the adhering rubbery polymer grows and gets into the high impact styrene resin, it becomes a fish eye in the final product.

Further investigations of the present inventors made in view of the above situation have now led to the discovery that when continuous bulk polymerization of a styrene monomer in the presence of a rubbery polymer is carried out in a tubular reactor, such as a static mixer, having fixedly set therein a plurality of mixing elements having no moving parts, and a minor part or a major part of the resulting initial-stage polymer solution is recycled and allowed to join a flow of the feed material solution, the rubbery polymer in the feed material solution and the initial-stage polymer solution are easily divided into fine particles and uniformly dispersed, the grafting ratio is increased, and a high impact styrene resin can be easily obtained which has excellent strength and in which the grafted rubbery polymer has a narrow particle size distribution. It has also been found that this method in particularly suitable for the production of high-impact polystyrene called HIPS from polybutadiene and styrene.

Thus, according to the present invention, there is provided, in a process for producing a high impact styrene resin by continuously polymerizing a styrene monomer in bulk in the presence of a rubbery polymer, the improvement wherein a polymerization line is used which is comprised of an initial-stage polymerization line (II) following a material feed line (I) and consisting of one or more tubular reactors having fixedly set therein a plurality of mixing elements having no moving parts, a main polymerization line (III) following the initial-stage polymerization line (II) and consisting of one or more tubular reactors having fixedly set therein a plurality of mixing elements having no moving parts, and a recycle line (IV) which branches between the initial-stage polymerization line (II) and the main polymerization line (III) and returns to the initial-stage polymerization line, and a minor part or a major part of a flow of the initial-stage polymer solution leaving the initial-stage polymerization line (II) is recycled through the recycle line (IV) while the remaining non-recycled initial-stage polymer flow is polymerized in the main polymerization line (II).

BRIEF DESCRIPTION OF THE DRAWING FIGURE

The drawing FIGURE is a schematic representation of a reactor apparatus utilized to effectuate the polymerization process of the present invention.

DESCRIPTION OF THE INVENTION

Typical examples of the rubbery polymer used in this invention include polybutadiene rubber, styrene/butadiene copolymer rubber, styrene/butadiene/styrene block copolymer rubber, ethylene/propylene terpolymer rubber, butadiene/acrylonitrile copolymer rubber, butyl rubber, acrylic rubber, styrene/isobutylene/butadiene copolymer rubber and isoprene/acrylic ester copolymer rubbers. They may be used either singly or in combination.

The styrene monomer used in this invention generically denotes styrene, alpha-methylstyrene, and styrene derivatives resulting from substitution of a halogen atom or a $C_1$–$C_4$ alkyl group for a hydrogen atom on the benzene ring. Typical examples are styrene, o-chlorostyrene, p-chlorostyrene, p-methylstyrene, 2,4-dimethylstyrene and t-butylstyrene.

In the present invention, another monomer copolymerizable with the styrene monomer (to be referred to as the "other monomer") may be used in combination with the styrene monomer. Examples of the other monomer are acrylonitrile, acrylic acid, alkyl acrylates, methacrylic acid, alkyl methacrylates, maleic anhydride and various maleimides.

A suitable amount of a solvent may be used to adjust the viscosity of the polymer solution in the bulk polymerization in accordance with this invention. The solvent may, for example, be toluene, ethylbenzene or xylene. The amount of the solvent used is usually not more than 20 parts by weight per 100 parts by weight of the resin component composed of the rubbery polymer and the styrene monomer and other monomer.

If desired, a known organic peroxide which releases free radicals on decomposition such as benzoyl peroxide, di-t-butyl peroxide or dicumyl peroxide, may be included as a polymerization initiator into the starting material solution used in this invention. If further required, known additives such as a plasticizer an antioxidant and a chain transfer agent may be incorporated.

The tubular reactor used in this invention denotes a tubular reactor having fixedly set therein a plurality of mixing elements having no moving parts. The mixing elements may be those which perform mixing of the polymer solution by repeating division of the polymer solution flow coming into the tube, changing of the flowing direction and/or the dividing direction, and association of the divided flows. Examples of the tubular reactor include a Sulzer-type tubular mixer, a Kenix-type static mixer, a Toray-type tubular mixer, and the tubular reactor described in the above-cited U.S. Pat. No. 4,275,177.

Tubular reactors may be incorporated in the initial polymerization line (II and the main polymerization line (III) and if required, further in the recycle line (IV).

The total of the number of tubular reactors in the initial polymerization line (II) and the number of tubular reactors in the main polymerization line (III) is not particularly limited because, for example, in the case of a tubular reactor of the type exemplified above, it differs depending upon the length, the structure and number of mixing elements, etc. Usually, 4 to 15 (preferably 6 to 10) tubular reactors each having at least 5 (preferably 10 to 40) mixing elements are used in combination. The number of static mixers to be incorporated in the initial polymerization line (II) and optionally the recycle line (IV) is 1 to 10, preferably 2 to 6.

In the present invention, a reactor for preliminary polymerization may be set up between the material feed line (I) and the initial-stage polymerization line (II). This arrangement is effective when it is desired to obtain a resin having a high rubbery polymer content or a resin having a small average particle diameter and a narrow particle size distribution. The degree of the preliminary polymerization differs depending upon the content of the rubbery polymer, and is usually within a range where the relation $b'=0.3a$ to $2a$, preferably $b'=0.3a$ to $a$, are established between the polymerization conversion $b'$ % by weight of a monomer component composed of the styrene monomer and another monomer added optionally, and the content $a$ % by weight of the rubbery polymer. There is no particular restriction on a reactor to be used in the preliminary polymerization. For example, it is a stirred tank reactor, a stirred tubular reactor, or a tubular reactor having fixedly set therein a plurality of mixing elements having no moving parts. The stirred tank reactor is preferred.

In the present invention, it is preferred to set up an in-line mixer having dynamic mixing elements in any desired site in a circulating line (to be referred to as the circulating line) formed of the initial polymerization line (II) and the recycle line (IV), preferably in the initial polymerization line (II) after the association of the recycle line (IV), bacause the rubbery polymer can be divided finely and dispersed as fine particles within a short period of time and a high impact styrene resin having particularly excellent gloss can be obtained. The dynamic in-line mixer is preferably a dynamic piping mixer comprised of a tubular housing portion, dynamic mixing elements for forcibly performing stirring within the housing portion such as propeller-type, turbine-type or anchor-type stirring vanes, and a shaft portion supporting the mixing means. The clearance between the inner wall of the housing and the stirring vanes is usually 0.1 to 2 mm, preferably 0.2 to 1 mm.

Preferred examples of the dynamic in-line mixer are a special anchor-type mixer made by Satake Chemical Industry Co., Ltd., an angle-type mixer made by Chemineer Company, a pipeline mixer made by Greerco Company, and a kneader-type mixer made by Kurimoto Tekkosho Co., Ltd.

The starting material solution to be fed from the starting material feed line (I) comprises the rubbery polymer and the styrene monomer, and optionally another monomer, a solvent, a polymerization initiator and other known additives.

The proportion of the rubbery polymer used is preferably 3 to 15% by weight based on the total weight of the rubbery polymer, the styrene monomer and the other optional monomer because the rise of the viscosity of the polymer solution in the circulating line is little, the particle size can be easily controlled, and a high impact styrene resin having excellent impact strength can be obtained.

The starting material solution fed from the material feed line (I) is continuously associated and mixed with the initial-stage polymer solution circulating in the recycle line (IV) and is polymerized in a tubular reactor in the initial polymerization line (II) usually at a reaction temperature of 110° to 140° C. to precipitate a grafted rubbery polymer. Since the precipitated grafted rubbery polymer is suitably mixed and dispersed by the tubular reactor as soon as it is precipitated, its conversion to fine particles and uniform dispersion are effectively promoted.

When a tubular reactor is provided in the recycle line (IV), the initial-stage polymer solution circulating under a suitable shearing force and a fresh supply of the starting material solution are very effectively mixed.

The recycle ratio (R) of the polymer solution is usually $R = F_1/F_2 = 1-20$ wherein $F_1$ is the flow rate (liters/hr) of the initial-stage polymer solution flowing in the recycle line (IV), and $F_2$ is the flow rate (liters/hour) of the initial-stage polymer solution which flows into the main polymerization line (III) without being recycled or the starting material solution in the starting material feed line (I). Preferably, R is from 4 to 15 because at an R in this range, the recycling can be carried out stably, no polymer deposit occurs in the reactor wall, and fine particles of the rubbery polymer having a narrow particle size distribution can be obtained.

The extent of the initial polymerization is such that the polymerization conversion (b, % by weight) of the monomer component comprising the styrene monomer and the optional other monomer and the content (a, % by weight) of the rubbery polymer are usually in the following relation: $b = 0.9a$ to $5a$, preferably $b = 1.5a$ to $3a$. Since within this range, the rubbery polymer can be easily converted to fine particles and dispersed, there can be obtained a high impact styrene resin in which the grafted rubbery polymer particles having an average particle diameter of 0.5 to 6 micrometers, preferably 0.8 to 3 micrometers, are uniformly dispersed. When the reactor for the preliminary mixer is set up between the material feed line (I) and the initial polymerization line (II), or the dynamic in-line mixer is incorporated in the recycle line (IV) the average particle diameter of the grafted rubbery polymer particles is 0.3 to 2 micrometers, preferably 0.5 to 1.5 micrometers.

A minor part or a major part of the initial-stage polymer solution obtained is recycled as stated above and associated with the starting material solution or the initial-stage polymer solution in the initial polymerization. The remainder is fed to the main polymerization line (III), and continuously polymerized usually at a reaction temperature of 130° to 170° C. until the polymerization conversion of the monomer component composed of the styrene monomer and the optional other monomer usually reaches 70 to 90% by weight. The product obtained after the polymerization is pelletized after the unreacted monomers and solvent are removed under reduced pressure in, for example, a devolatilization tank to give the desired high impact styrene resin.

The following Examples and Comparative Examples illustrate the present invention more specifically. In these examples, all parts and percentages are by weight.

The accompanying drawing is a diagram showing the apparatus used in the following examples for practicing the process of this invention.

(1) Content of the Rubber Polymer

Infrared absorptions are determined by an infrared spectrophotometer, and the intensity of the absorptions is compared with a calibration curve prepared in advance.

(2) Izod Impact Value Measured in accordance with JIS K-6871.

(3) Surface Gloss

Measured in accordance with JIS Z-8741.

(4) Grafting Ratio

One gram of the resin is added to 50 ml of a 1:1 (by weight) mixture of methyl ethyl ketone and acetone, and the mixture is vigorously shaken to dissolve and/or swell the resin. The insoluble matter is then sedimented by a centrifugal separator, and by decantation, the supernatant liquid is discarded. The resulting methyl ethyl ketone/acetone-insoluble portion is dried at 50° C. under reduced pressure. It was cooled in a desiccator, and then weighed. The grafting ratio is calculated in accordance with the following equation.

$$\text{Grafting ratio} = \frac{\text{Methyl ethyl ketone/acetone-insoluble portion (g)} - \text{Rubbery polymer (g)}}{\text{Rubbery polymer (g)}}$$

(5) Average Particle Size and Its Distribution of the Rubbery Polymer in the Resin The 50% median diameters of the weight average and the number average are determined by a Coulter counter (Model TA-II made by Coulter Electronics Inc.). The resulting 50% median diameters are defined respectively as the volume average particle diameter and the number average particle diameter, and the ratio of these, as the distribution of the particle size. The smaller the value of this ratio, the narrower the particle size distribution.

EXAMPLE 1

In this example, an apparatus of the type shown in the accompanying drawing was used. A gear pump 1 for feeding the starting material is incorporated in a starting material feed line (I). Tubular reactors 2, 3, 4 and 5 having an inside diameter of 2 inches and a length of 1 m (static mixer made by Noritake Co.; including twelve N 10 type mixing elements) are connected in series in an initial polymerization line (II) following the starting material feed line (I). Tubular reactors 6, 7, 8 and 9 of the same structure are connected in series in a main polymerization line (III) following the initial polymerization line (II). A recycle line (IV) connects the outlet portion of the tubular reactor 5 and the inlet portion of the tubular reactor 2, and a gear pump 10 is incorporated at its center. An after-treatment device comprised of, for example, a gear pump 11, a heat exchanger 12, a devolatilization tank 13 and an extruder 14 is connected to the tubular reactor 9. In this apparatus, a circulating path is formed ranging from the outlet of the tubular reactor 5 to the tubular reactors 2, 3, 4 and 5 via the gear pump 10.

A starting material solution composed of 5 parts of polybutadiene (Diene NF35A, Asahi Chemical Industry Co., LTD. polybutadiene content, a, 5%) and 95 parts of styrene monomer was prepared, and then continuously polymerized in bulk in the above apparatus under the following conditions using the polymerization lines mentioned above.

Flow rate ($F_1$) of the recycle line (IV): 25 liters/hr.

Flow rate ($F_2$) of the starting material feed line (I): 5 liters/hr.

Recycle ratio ($R = F_1/F_2$):5

Reaction temperature in the recycle line: 130° C.

Polymerization conversion (b) of the monomer component at the outlet portion of the tubular reactor 5: 10%.

Reaction temperature in the main polymerization line: 155° C.

The resulting polymer solution was heated to 23° C. by the heat exchanger and volatile components were removed under a reduced pressure of 50 mmHg. The residue was melted, kneaded and pelletized in the extruder to obtain a high impact styrene resin in accordance with this invention. The various properties of the resin were measured, and the results are shown in Table 1.

EXAMPLE 2

A high impact styrene resin in accordance with this invention was prepared in the same way as in Example 1 except that the reaction temperature in the recycle line was changed to 135° C., and the polymerization conversion (b) of the monomer component at the outlet portion of the tubular reactor 5 was changed to 13%. The properties of the resin are shown in Table 1.

EXAMPLE 3

A high impact styrene resin in accordance with this invention was prepared in the same way as in Example 1 except that a starting material solution composed of 10 parts of polybutadiene, 90 parts of styrene and 5 parts of ethylbenzene was used, the recycle ratio (R) in the recycle line was changed to 5, and the polymerization conversion (b) of the monomer component was changed to 24%. The properties of the resin are shown in Table 1.

EXAMPLE 4

A high impact styrene resin in accordance with this invention was prepared in the same way as in Example 3 except that the recycle ratio (R) in the recycle line was changed to 8; the polymerization conversion (b) of the monomer component, to 18%; and the reaction temperature, to 127° C. The properties of the resin are shown in Table 1.

EXAMPLE 5

A high impact styrene resin in accordance with this invention was prepared in the same way as in Example except that a starting material solution composed of 6 parts of polybutadiene (polybutadiene content, a, 6%) and 94 parts of styrene was used, and a dynamic in-line mixer (made by Greerco Company, U.S.A.; 6 turbines, clearance 0.5 mm) was incorporatred in series between the tubular reactors 3 and 4, and the rotating speed of the dynamic in-line mixer was set at 700 rpm. The properties of the resin are shown in Table 1.

EXAMPLE 6

A high impact styrene resin in accordance with this invention was prepared in the same way as in Example 5 except that the recycle ratio (R) in the recycle line was changed to 7, and the rotating speed of the dynamic in-line mixer was changed to 1500 rpm. The properties of the resin are shown in Table 1.

EXAMPLE 7

A high impact styrene resin in accordance with this invention was prepared in the same way as in Example 5 except that a starting material solution composed of 12 parts of polybutadiene, 88 parts of styrene and 5 parts of ethylbenzene was used, the recycle ratio (R) in the recycle line was changed to 8, and the rotating speed of the dynamic in-line mixer was changed to 1800 rpm. The properties of the resin are shown in Table 1.

EXAMPLE 8

A high impact styrene resin in accordance with this invention was prepared in the same way as in Example 5 except that the recycle ratio (R) in the recycle line was changed to 8 and the reaction temperature was changed to 127° C. so that the polymerization conversion (b) of the monomer component became 18%. The properties of the resin are shown in Table 1.

EXAMPLE 9

The same apparatus as used in Example 1 was used except that a 20-liter tank reactor of the complete mixing type equipped with helical stirring vanes was set up between the material feed line (I) and the initial-stage polymerization line (II).

The same polymerization as in Example 1 was carried out except that a mixture of 10 parts of polybutadiene, 90 parts of styrene and 5 parts of ethylbenzene was used as the starting material solution; the polymerization conversion (b') of the monomer component at the outlet portion of the tank reactor was changed to 8%; the recycle ratio (R) in the recycle line was changed to 5; and the polymerization conversion (b) of the monomer component at the outlet portion of the tubular reactor (5) was changed to 35 %. The various properties of the resulting high impact styrene resin were measured, and the results are shown in Table 1.

COMPARATIVE EXAMPLE 1

Polymerization reaction was carried out in a continuous reaction apparatus comprised of two 20-liter tank reactors of the complete mixing type equipped with helical stirring vanes, a heat-exchanger and a volatilization tank. The same starting material solution as used in Example 1 was fed continuously into a first tank reactor at a rate of 5 liters/hour with stirring, an polymerized in the initital stage at 130° C. The initial-stage polymer solution was continuously withdrawn from the bottom of the reactors at a rate of 5 liters/hour, and fed into a second tank reactor and polymerized there at 155° C. The polymeriztion product was worked up as in Example 1 to give a high impact styrene resin for comparison. The properties of the resin are shown in Table 1.

COMPARATIVE EXAMPLE 2

A high impact srtyrene resin for comparison was prepared in the same way as in Example 1 except that the initial polymerization was carried out using the first tank reactor used in Comparative Example 1 instead of the recycle line. The properties of the resin are shown in Table 1.

TABLE 1

| High impact styrene resin | | Examples | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| Rubbery polymer in the resin | Content (%) | 6.0 | 6.1 | 11.0 | 11.0 | 7.1 | 7.0 | 14.0 | 14.1 | 11.0 | 6.0 | 6.1 |
| | Volume average particle diameter ($\mu$m) | 1.2 | 1.7 | 1.5 | 0.9 | 0.9 | 0.6 | 1.1 | 1.3 | 0.9 | 1.2 | 1.2 |
| | Particle size distribution | 1.3 | 1.8 | 1.6 | 1.2 | 1.1 | 1.1 | 1.2 | 1.4 | 1.1 | 1.7 | 1.6 |
| Grafting ratio | | 2.0 | 2.3 | 1.5 | 1.4 | 2.5 | 2.4 | 2.5 | 2.7 | 1.8 | 1.3 | 1.2 |
| Izod impact strength (Kg-cm/cm) | | 7.5 | 8.2 | 12.5 | 10.8 | 8.3 | 8.0 | 15.8 | 16.3 | 10.5 | 5.5 | 5.7 |
| Surface gloss (gloss value) | | 85 | 74 | 79 | 90 | 93 | 95 | 87 | 82 | 92 | 81 | 82 |

What we claim is:

1. In a process for producing a high impact styrene resin by continuously polymerizing a styrene monomer in bulk in the presence of a rubbery polymer, the improvement wherein a polymerization line is used which is comprised of an initial-stage polymerization line (II) following a material feed line (I) and consisting of one or more tubular reactors having fixedly set therein a plurality of mixing elements having no moving parts, a main polymerization line (III) following the initial-stage polymerization line (II) and consisting of one or more tubular reactors having fixedly set therein a plurality of mixing elements having no moving parts, and a recycle line (IV) which branches between the initial-stage polymerization line (II) and the main polymerization line (III) and returns to the initial-stage polymerization line (II), and a major part of a flow of the initial-stage polymer solution leaving the initial-stage polymerization line (II) is recycled through the recycle line (IV) while the remaining nonrecycled initial-stage polymer flow is polymerized in the main polymerization line (II), the ratio R of the flow rate ($F_1$) of the initial-stage polymer solution recycled via the recycle line (IV) to the flow rate ($F_2$) of the starting material solution fed from the material feed line (I), $F_1/F_2$, being from 4 to 15.

2. The process of claim 1 wherein the rubber polymer is polybutadiene and the styrene monomer is styrene.

3. The process of claim 2 wherein a reactor for preliminary polymerization is set up between the material feed line (I) and the initial-stage polymerization line (II).

4. The process of claim 2 wherein a dynamic in-line mixer is incorporated in a recycle passage comprised of the recycle line (IV) and the initial-stage polymerization line (II).

5. The process of claim 1, 2, 3 or 4 wherein the initial-stage polymerization in the initial-stage polymerization line (II) is carried out until a conversion represented by the following equation $$b = 0.9a \text{ to } 5a$$

wherein a is the content in % by weight of the rubbery polymer based on the total weight of the rubbery polymer, the styrene monomer and another optional monomer, and b is the polymerization conversion % by weight of the monomer components, is obtained.

6. The process of claim 1, 2, 3 or 4 wherein the total number of the tubular reactors in the initial-stage polymerization line (II) and the tubular reactors in the main polymerization line (III) is from 4 to 15.

* * * * *